United States Patent [19]
Hüttlin

[11] Patent Number: 4,545,792
[45] Date of Patent: Oct. 8, 1985

[54] DEVICE AND PROCESS FOR PRECIPITATING FOREIGN MATTER FROM A GAS STREAM

[75] Inventor: Herbert Hüttlin, Steinen, Fed. Rep. of Germany

[73] Assignee: Condair AG, Switzerland

[21] Appl. No.: 584,110

[22] Filed: Feb. 27, 1984

[30] Foreign Application Priority Data

Feb. 28, 1983 [DE] Fed. Rep. of Germany ....... 3307048

[51] Int. Cl.³ ................ B01D 45/16; B01D 47/06
[52] U.S. Cl. .................. 55/241; 55/257 NP; 55/257 HE; 55/269; 55/443; 55/446
[58] Field of Search ........... 55/17, 238, 241, 257 QV, 55/257 HE, 257 MP, 277, 278, 443–446, 267, 269

[56] References Cited
U.S. PATENT DOCUMENTS

| | | | |
|---|---|---|---|
| 1,212,996 | 1/1917 | Parker | 55/17 X |
| 1,560,333 | 11/1925 | Carty | 55/241 X |
| 2,081,406 | 5/1937 | Mazza | 55/17 X |
| 2,452,859 | 11/1948 | Moody | 55/241 |
| 3,403,497 | 10/1968 | Mey | 55/241 X |
| 3,538,684 | 11/1970 | Esterhoy, Jr. et al. | 55/238 X |
| 3,561,196 | 2/1971 | Westlin | 55/443 X |
| 3,813,856 | 6/1974 | Jensen | 55/444 |
| 3,932,151 | 1/1976 | Lau | 55/241 X |
| 4,014,671 | 3/1977 | Andro et al. | 55/442 X |
| 4,099,941 | 7/1978 | Gutermuth et al. | 55/440 X |
| 4,175,935 | 11/1979 | Gutermuth et al. | 55/440 X |

FOREIGN PATENT DOCUMENTS

| | | |
|---|---|---|
| 0044720 | 1/1982 | European Pat. Off. |
| 2659647 | 7/1977 | Fed. Rep. of Germany |
| 2731996 | 1/1979 | Fed. Rep. of Germany ........ 55/444 |
| 58681 | 10/1969 | Poland |

Primary Examiner—Robert Spitzer
Attorney, Agent, or Firm—Pahl, Lorusso & Loud

[57] ABSTRACT

A crossflow wall for a gas stream has baffle elements which form inlet ducts, which narrow in the inflow direction, and end in a steadying bead. Coaxially to the baffle elements, concave impingement surfaces are arranged which are staggered relative to the baffle elements and are curved at a distance around the steadying bead thereof, so that they deflect the gas stream to the rear of the baffle elements. The baffle elements and impingement surfaces are of at least approximately rotationally symmetrical shape and are arranged with pairs of them having parallel axes. Between the impingement surfaces, outlet ducts are left free, through which the gas stream leaves at least approximately parallel to the inflow direction. The heavy foreign matter particles accumulating in the vicinity of the impingement surface are collected in the peripheral edge of the impingement surface by a collecting channel, are passed into a collecting chamber and extracted.

4 Claims, 12 Drawing Figures

DEVICE AND PROCESS FOR PRECIPITATING FOREIGN MATTER FROM A GAS STREAM

BACKGROUND OF THE INVENTION

The subject of the present invention is a device for precipitating foreign matter from a gas stream, with at least one crossflow precipitator unit which has an inlet duct bounded by a baffle element and a rotationally symmetrical, concave impingement surface which is disposed coaxially to this inlet duct and is curved at a distance around the mouth of the inlet duct, so that an annular outlet duct is formed between the impingement surface and the back of the baffle element.

In known devices of this generic type (German Specification Nos. 2,641,765 C3 and 2,659,647 A1), the baffle and impingement surfaces of channel-type profile parts are formed in such a way that each baffle surface overlaps adjacent longitudinal edges of two impingement surfaces, and vice versa. The profile parts can also be of hollow design, to allow a heating or cooling medium to flow through, and can thus form a heat exchanger which can be connected to a heat recuperator. Nozzles through which a cleaning fluid can be sprayed can also be arranged on the baffle and impingement surfaces.

European Specification No. AZ 0,004,720 describes a precipitator which is used especially for internal combustion engines and in which the air stream which is to be purified passes without significant deflection through a wall assembled from several precipitator elements. By means of appropriately formed spin surfaces, the gas stream is set into rotation in each precipitator element, the entrained dust being concentrated in the peripheral edge zone by centrifugal force and then being tangentially discharged through an orifice. Perfect functioning of this precipitator is entirely dependent on the individual rotating gas streams not interferring with one another. For this reason is is indispensible, even if the gas streams of mutually adjacent precipitator elements rotate in opposite directions, to screen the individual precipitator elements rheologically from one another by partitions; this requires additional expense and, moreover, reduces the overall efficiency of the unit.

It is therfore the object of the invention to propose a device of the type initially set out, which permits uncomplicated assembly of an entire precipitator wall from a multiplicity of precipitator elements, without separation of the precipitator elements from one another being necessary; moreover, an improvement in the efficiency of the known units and preferably also in their noise behavior is intended.

SUMMARY OF THE INVENTION

The invention which achieves this object is defined in the independent claim 1.

By means of this arrangement, the gas stream which is to be purified is initially strongly accelerated, driven apart in the shape of an umbrella after impingement, steadied by the interaction of the impingement surface and the steadying bead and at the same time diverted outwards from the center. The heavy foreign matter accumulating near to the impingement surface can consequently be collected and extracted through a peripheral annular gap.

As can be proved experimentally, a precipitator unit constructed in such a way operates with an extremely high efficiency.

As is known, the precipitation of foreign matter of relatively small mass represents a particular problem. To enable even this foreign matter to be reliably separated from the main gas stream, the device according to the invention can be provided with nozzles for spraying a liquid into the gas stream and/or onto the impingement surfaces. In this case, the nozzles are arranged, according to the invention, in the end zones of the distributors. This arrangement makes it possible to distribute the liquid in the gas stream with particular uniformity. Preferably, the nozzles are each arranged behind a conical cap, by means of which they are protected from fouling by particles of foreign matter in the arriving gas stream.

In the device according to the invention, in the same way as in the known devices described, the impingement surfaces, together with a rear wall disposed behind them, and having a similar shape, can each delimit a cavity, through which a heating or cooling medium can flow. Within the scope of the invention, this design is preferably further developed in such a way that a feed line for the heating or cooling medium leads into the cavity in the end zone of each projection. As a result, a rotationally symmetrical flow of the heating or cooling medium on the rear or the impingement surface can be obtained. The cavity can be subdivided by a partition arranged substantially parallel to the impingement surface and can be connected to a return line for the heating or cooling medium, arranged coaxially to the feed line.

The baffle and impingement surfaces according to the invention have a high inherent strength, if only because of their substantially rotationally symmetrical shape, so that they hardly tend to drumming or rattling, unlike the channel-type baffle and impingement surfaces of the known generic devices. Furthermore, in order to eliminate flow noises as completely as possible, the impingement surfaces are preferably each supported on a support body which is composed of a heat insulating material having an anti-drumming effect, is likewise of substantially rotationally symmetrical shape and has on its rear a pin, by means of which it is fastened to a frame which is subdivided in the manner of a grid. It this case, the collecting chamber can be formed within the support body.

The invention also relates to a crossflow wall which is defined in independent claim 11, and to a precipitating process defined in independent claim 12.

BRIEF DESCRIPTION OF THE DRAWINGS

Illustrative embodiments of the invention are described below, with further details, by reference to diagrammatic drawings in which:

FIG. 8 shows the section VII—VII in FIG. 7, FIGS. 9 to 11 illustrate three different operating phases by means of section representations.

DETAILED DESCRIPTION OF THE PREFERRED EMBODIMENTS

The device shown in FIGS. 1 to 8 has a square frame 10 of sheet metal, preferably stainless steel sheet. On the front of the frame 10, on the right in FIGS. 1 and 5, the edge of a baffle plate 12 is fastened, which likewise is square and preferably consists of stainless steel sheet. On the baffle plate 12, nine funnel-shaped baffle surfaces 14 are formed, for example by deep-drawing, which each define an inlet duct 16 and have seamless transitions from one to the other in the example shown. The baffle surfaces 14 are each rotationally symmetrical relative to an axis A and each end at an annular steadying bead 18. The axes A are arranged mutually parallel at equal distances from one another.

Behind each baffle surface 14 shaped as a venturi nozzle, and coaxially with it, an impingement surface 20 is provided which, according to FIGS. 1 to 12, is formed by the smooth front of a solid, rotationally symmetrical impingement wall 22 of corrosion-resistant metal. The impingement walls 22 each have an annular outer edge 24 (FIGS. 4 and 5) which surrounds the rear of the associated baffle surface 14 at a radial distance which is approximately equal to the radial distance between the steadying bead 18 of the same baffle surface 14 and an approximately conical axial flow distributor 26 formed in the center of the impingement surface 20. Seen from the front, that is to say in the direction of the arrow II in FIG. 1, the baffle surfaces 14 have a convex curvature and the impingement surfaces 20 have a concave curvature. Due to these curvatures, a significantly widened annular space results between each steadying bead 18 and the associated edge 24.

The steadying bead 18 has at least approximately the same curvature as the impingement surface 20 located opposite thereto and has the object of steadying the gas stream which, after impingement, flows outwards in the shape of an umbrella. The annular flow path taken by the gas from the flow distributor 26 until it passes the edge 24, preferably has a cross-section which increases from the inside outwards.

Each of the impingement walls 22 has an axial hole 28, and its rear is supported on a support body 30 of rigid polyurethane foam, which is likewise penetrated by the hole 28. On the rear of each support body 30, a pin 32 is integrally formed, which is inserted from the front into a carrier ring 34 of metal and is secured therein by a slotted locking ring 36 of plastic. The carrier rings 34 form, together with struts 38 fixed to the frame 10, a grid-type support structure which holds the support bodies 30 at such distances that an outlet duct 40 remains free around each support body 30.

Around each impingement wall 22 and coaxially thereto, a collection surface 42 of corrosion-resistant sheet metal is curved from the outside inwards around the edge 24 at such a distance that a narrow annular gap 44 remains free. The gap 44 is adjoined by a likewise annular collecting chamber 46 which is made in the support body 30 and which can be emptied via an extraction branch 48. The extraction branch 48 is connected to an extraction device (extractor fan).

Figure 4:
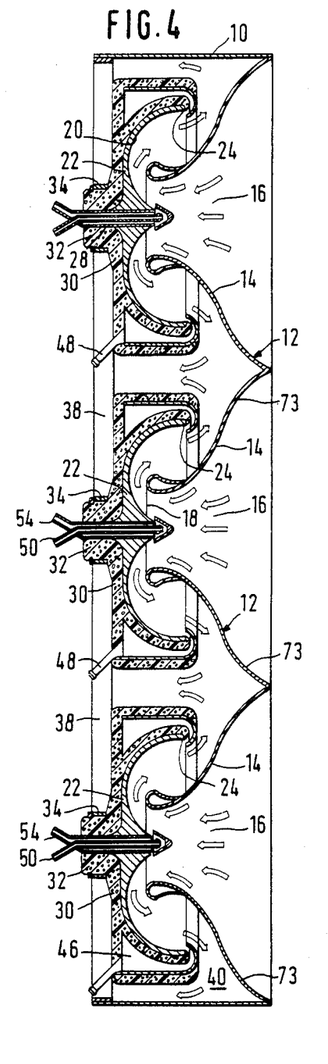
FIG. 4 shows a vertical axial section of an embodiment variant.
Figure 5:
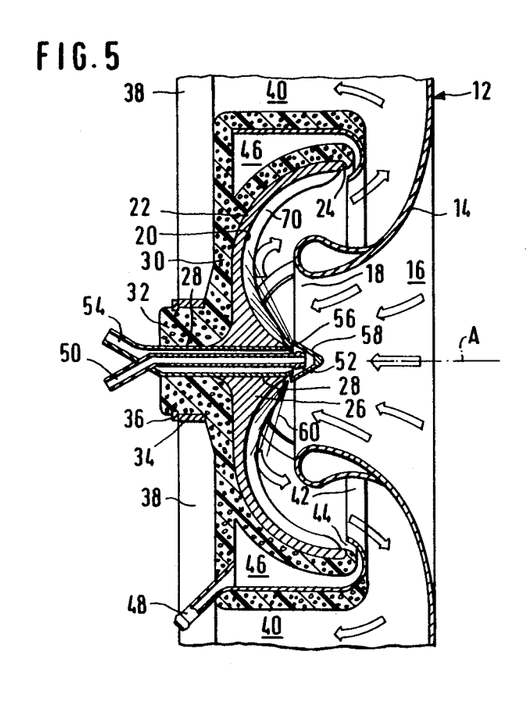
FIG. 5 shows an enlarged portion of FIG. 4.

In the device shown in FIGS. 4 and 5, a feed line 50, a nozzle 52 of which ends within the flow distributor 26, is arranged in the axial hole 28. A further line 54 with an annular nozzle 56 formed on its end is likewise arranged within the hole 28, coaxially with the feed line 50. In front of the two nozzles 52 and 56, a hollow conical cap 58 is provided which is fastened to the flow distributor 26. The cap 58 has the effect that a liquid fed under pressure through the feed line 50 and emerging through the nozzle 52 is deflected and forms a rotationally symmetrical umbrella 60 of liquid which, within an annular zone enclosed by the steadying bead 18, points obliquely rearwards and radially outwards. The formation of this umbrella 60 of liquid is promoted by feeding compressed air through the further line 54, which air issues from the nozzle 56 in a sharp annular jet and finely atomizes the liquid, which has emerged from the nozzle 52, and ensures intensive contact of the liquid droplets with the particles of foreign matter contained in the gas stream.

The device shown in FIGS. 1 to 12 is a constituent of a ventilation unit, the further constituents of which are designed in a known manner and are therefore not shown. The flow of air, which is to be purified by removing, for example, dust particles and fat particles, arrives in the direction of the arrow II in FIG. 1 and passes into the inlet ducts 16 in which it is strongly accelerated up to the mouth M thereof. The liquid sprayed in the form of the umbrella 60 of liquid (FIG. 5) is finely distributed in the rebounded gas stream, so that the dust particles and fat particles adhere to liquid droplets which then precipitate on the impingement surface 20, are moved by the air stream essentially radially outwards along this impingement surface and are collected by the annular gap 44, from where they reach the collecting chamber 46 and finally flow out through the extraction branch 48 or—depending on the fluidity and quantity of the foreign matter precipitated from the air—are extracted under a more or less extensive vacuum. The air flows around the outside of the collecting surface 42 and the associated support body 30 into the open or back into a closed circulation, to the plate, where it had been contaminated with foreign matter.

Figure 1:
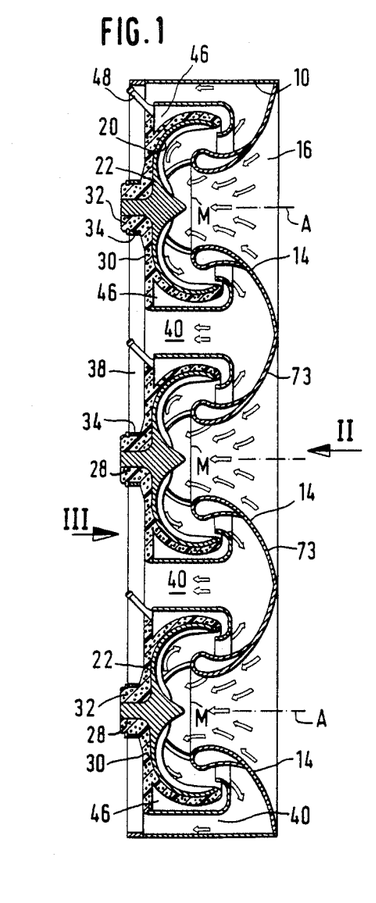
FIG. 1 shows a vertical axial section through a device for precipitating dust-type foreign matter from an air stream.
Figure 2:
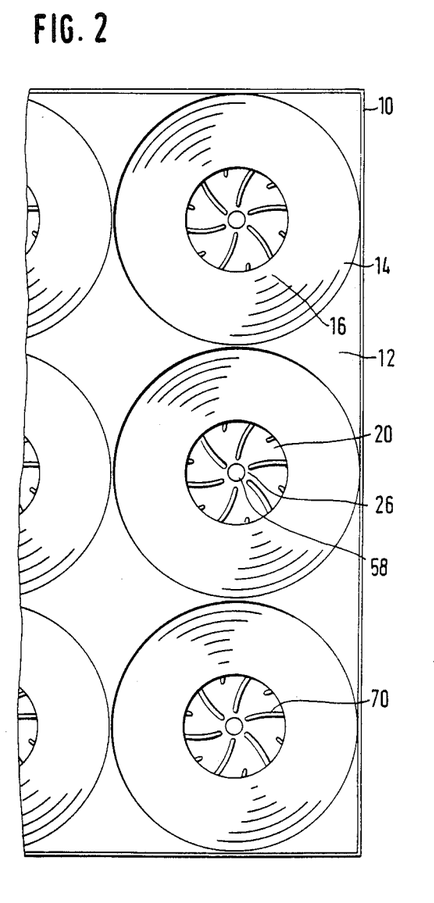
FIG. 2 shows a partial front view of the device along arrow II in FIG. 1.
Figure 3:
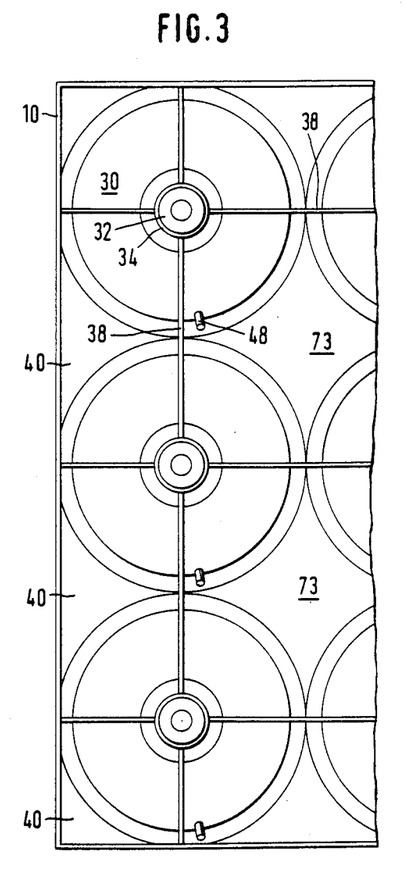
FIG. 3 shows a partial rear view along arrow III in FIG. 1.

A precipitator unit usually comprises a multiplicity of the devices described, which are combined to form a crossflow wall. For rheological reasons, it is then advantageous to provide the outer surfaces of the baffle elements 14—as shown in FIG. 1 or 4—with an aerodynamic profile 73. As FIG. 3 shows, such a profile 73 should be fitted in each case in the intermediate region between four precipitator devices.

Figure 6:
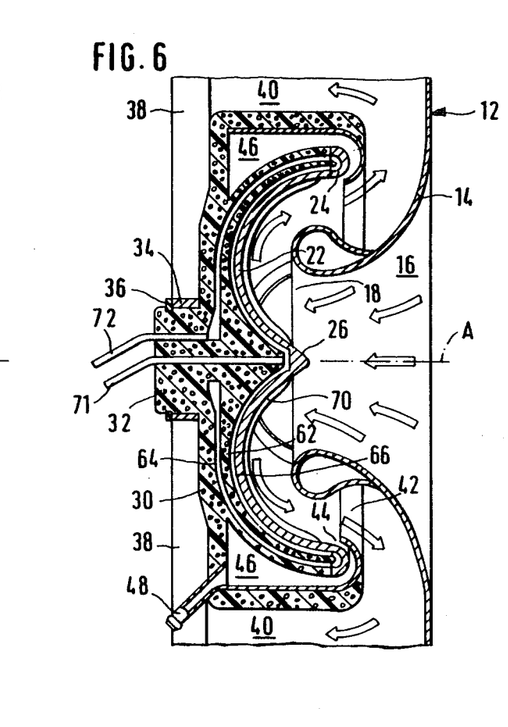
FIG. 6 shows a portion, corresponding to FIG. 5 of a device for condensing vaporised foreign matter and for recovering heat from an air stream.

The device shown in a portion in FIG. 6 differs from that shown in FIGS. 1 to 5 essentially by the fact that the impingement wall 22 is not directly supported on the support body 30, but via a partition 62 and a rear wall 64. The walls 62 and 64 have approximately the same form as the impingement wall 22 and support the latter via bosses or the like which are not shown. The walls 22 and 64 delimit a cavity 66 which is divided by the partition 62. A cooling medium is introduced through a feed line 71 within the flow distributor 26 into the cavity 66. The cooling medium flows radially outwards on the inside of the impingement wall 22, flows around the partition 62 and, at the rear thereof, passes into a further line 72 which here leads as a return line to a cooling unit of known type (not shown). The cooling of the impingement walls 22 makes it possible to precipitate volatile foreign matter such as, for example, solvents from the air which flows through the device in the manner described and indicated by arrows.

Figure 7:
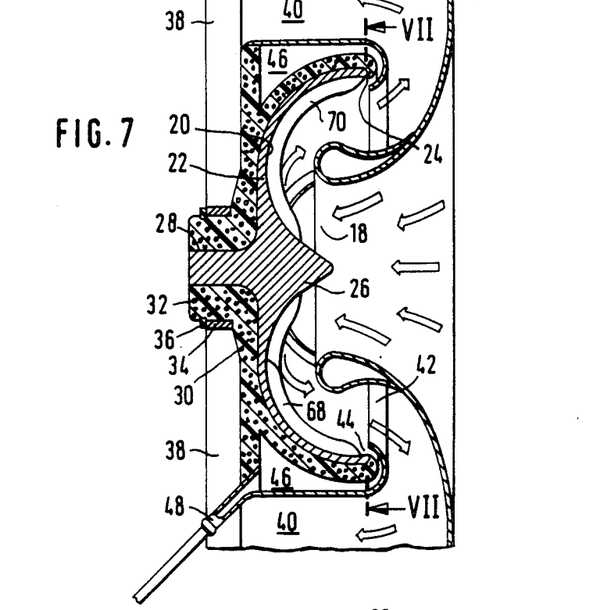
FIG. 7 shows a portion, corresponding to FIG. 5 of a device for the dry precipitation of dust-type foreign matter from an air stream.
Figure 8:
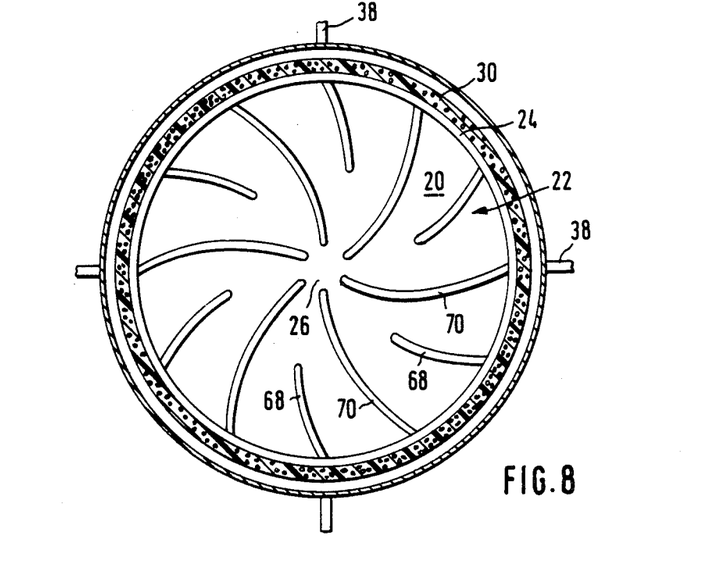
Figure 9:
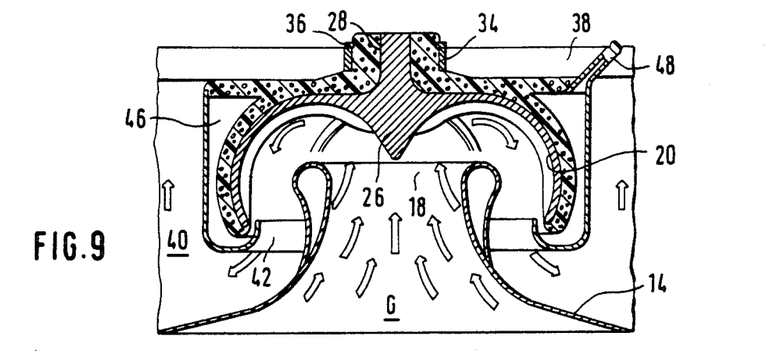

If neither cooling nor spraying with a liquid is necessary, the axial hole 28 according to FIGS. 7 and 9 can be closed with a plug. FIGS. 7 and 8 also show that several helical ribs 70 at equal angular distances are arranged with a mutual offset on the front of the impingement wall 22. The ribs 70 impart to the airflow a spin which additionally promotes the precipitation of particles of liquid or dust from the air. The inside of the baffle surface 14 can also be provided with such spin-imparting ribs.

Figure 10:
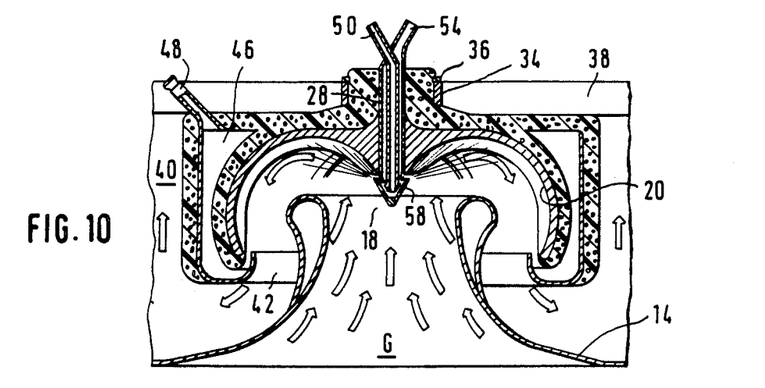
Figure 11:
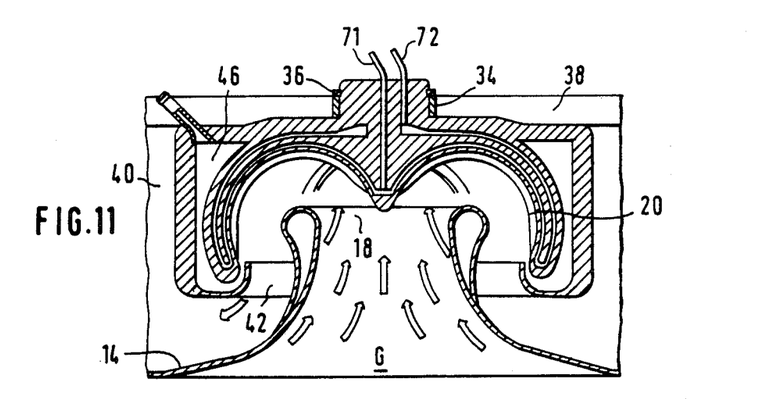

FIGS. 9 to 11 show three different modes of operation of embodiments of the device according to the invention, by means of sections in which the reference numbers already introduced are retained.

FIG. 9 shows dry dust precipitation, in which the solid particles present in the gas stream G are precipitated by dry means, that is to say without additional wetting. This process should above all be suitable for gas streams which carry along relatively heavy foreign matter particles.

By contrast, FIG. 10 illustrates wet precipitation, in which the relatively light dust particles entrained in the gas stream are wetted by means of the spray device 52, 58 already described, whereby their precipitation is strongly promoted.

FIG. 11 shows a device in which precipitation is effected by heat exchange, either by cooling or by heating. The medium fed in through line 71 and flowing out through line 72 effects condensation, if it is cold, and effects vaporisation if a hot medium is used.

The process of precipitating foreign matter from the gas stream can best be described by reference to the enlarged representation in FIG. 12. Under the design aspect, it should be stated first that the steadying bead marked 18 as a whole is formed in such a way that the lower end section of the baffle element 14 is bent over by about 180° and is in contact with the outer surface of the baffle element 14. The length, visible in the section, of the steadying bead 18 is, measured on its outer surface, a fraction of that length of the impingement surface 20 which extends from the center of the flow distributor 26 up to the peripheral edge 24 of the impingement surface 20. The curvature of the steadying bead 18 is matched to that of the impingement surface 20 in such a way that, over a major part of the abovementioned length of impingement surface, a radius r struck transversely to the gas flow touches points of at least approximately the same curvature on the impingement surface 20 and on the steadying bead 18. These points for the radius r are maked A and B in FIG. 12. This mutual correspondance of the curvature applies in the embodiment shown up to about the point E.

Figure 12:
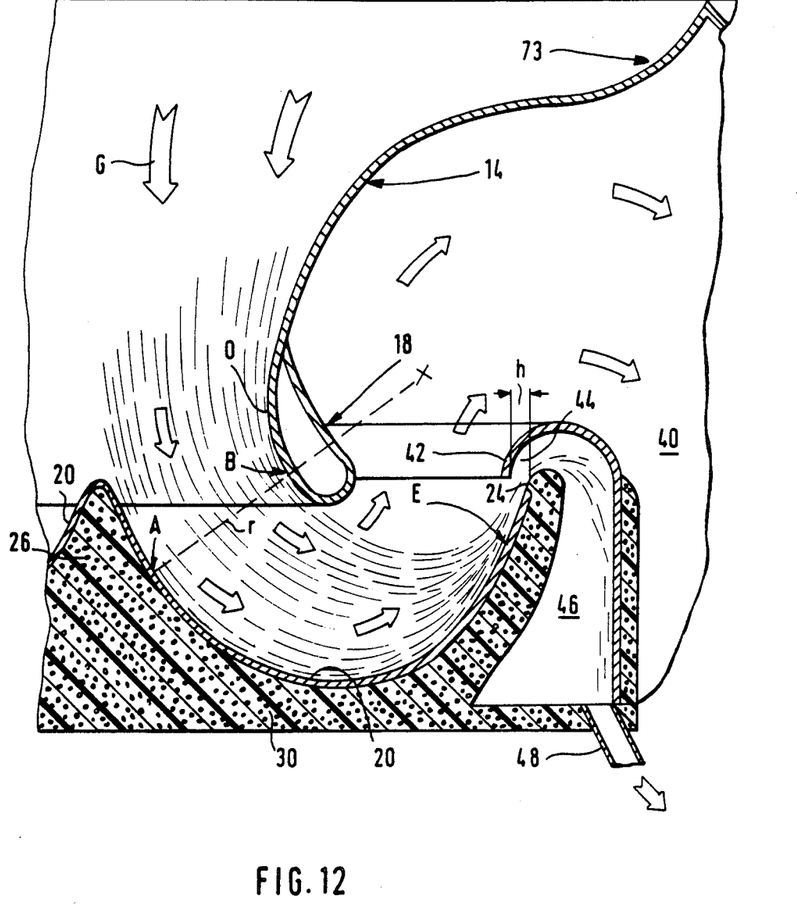
FIG. 12 shows a greatly enlarged design detail.

In FIG. 12, the foreign matter particles entrained in the gas stream are shown by interrupted stream lines, whilst the gas stream is marked by arrows. As a result of the design of the device, as described, the gas stream G—of which only the right-hand half of the cross-section is shown, for clarity—is initially strongly accelerated in the venturi-shaped baffle element 14, then impinges on the impingement surface 20 and is steadied during the deflection, the heavier foreign matter particles increasingly concentrating in the vicinity of the impingement surface 20 and finally being discharged by the collecting element 42 into the collecting chamber 46 and being extracted from there.

The embodiments described can be modified in diverse ways by those skilled in the art, within the scope of the invention. Thus, the tip of the flow distributor 26 can be located either, as shown in FIG. 9, below the mouth of the baffle element 14 or it can, according to FIG. 10, project into the interior of the baffle element 14. The cone angle of the flow distributor 26 can be, for example, between 75° and 120° in the region of the cone tip.

The baffle element 14 has its narrowest cross-section at the point o (FIG. 12), that is to say at a distance above the mouth of the baffle element.

It would also be possible, for example, to arrange the spray nozzle 52 within the baffle element 14.

I claim:

1. A device for precipitating foreign matter from gas streams, with at least one crossflow precipitator unit, comprising an inlet duct for a gas stream laden with foreign matter bounded by a baffle element which has the shape of a Venturi tube and is provided with a steadying bead at its mouth, further comprising a concave, rotationally symmetrical impingement surface which is disposed coaxially to this inlet duct and is curved at a distance around the mouth of the inlet duct and which has a conical tapered flow distributor projecting from the center thereof towards the baffle element, whereby the space between the flow distributor with its impingement surface and the baffle element constitutes an annular space for a flow path leading to the back of the baffle element, wherein (a) the impingement surface is curved around the steadying bead to such an extent that the mouth of the steadying bead extends to some extent into the space formed by the concave impingement surface and is enclosed by the radial outer edge of said impingement surface and such that the impingement surface surrounds the rear mouth end of the associated baffle surface at a radial distance, and (b) an annular collecting element is provided surrounding the periphery of the impingement surface and forming therewith an annular collecting chamber and with its internal edge surface this collecting element extends from the periphery into said annular space, by a radial distance (h) from the outer radial edge of the impingement surface which radial distance amounts to less than the radial distance between the outer edge of the impingement surface and the opposite radial edge of the mouth of the steadying bead, providing thereby an annular gap for introducing foreign matter, and (c) an outflow duct is provided surrounding the collecting chamber virtually coaxially and serving for the escape of the major portion of the purified gas stream, and (d) wherein the said flow distributor has a central opening through which both a liquid line and, concentrically thereto, a compressed air-line, are taken right into the mouth region of the baffle element, the liquid line having at its end associated with the distributor a spray nozzle, and the compressed-air line leading into a ring nozzle which surrounds the spray nozzle, and the spray nozzle and the ring nozzle being covered at a distance by a hollow conical cap which also forms the center of the distributor and which, between its free edge and the neighboring surface of the flow distributor leaves a free annular space which is open in the direction of the curved impingement surface.

2. A device as claimed in claim 1, wherein the impingement surface and/or the baffle element are provided with helical ribs in order to impart to the gas stream a spin which favors the precipitation of the foreign matter.

3. A device as claimed in claim 1, wherein the impingement surface is formed or carried by a concave impingement body, in the interior of this body, closed to the impingement surface, a system of channels with cavities is provided through which a cooling or heating medium can be pumped.

4. A device as claimed in claim 1, wherein the collecting chamber is connected to an extraction system.

* * * * *